(12) United States Patent
Murata

(10) Patent No.: US 12,142,030 B2
(45) Date of Patent: Nov. 12, 2024

(54) NEURAL NETWORK COMPRESSION DEVICE AND METHOD FOR SAME

(71) Applicant: Hitachi Astemo, Ltd., Hitachinaka (JP)

(72) Inventor: Daichi Murata, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 356 days.

(21) Appl. No.: 17/781,510

(22) PCT Filed: Oct. 30, 2020

(86) PCT No.: PCT/JP2020/040924
§ 371 (c)(1),
(2) Date: Jun. 1, 2022

(87) PCT Pub. No.: WO2021/111788
PCT Pub. Date: Jun. 10, 2021

(65) Prior Publication Data
US 2023/0005244 A1    Jan. 5, 2023

(30) Foreign Application Priority Data

Dec. 5, 2019   (JP) ................................ 2019-220172

(51) Int. Cl.
*G06V 10/774*   (2022.01)
*G05D 1/00*   (2024.01)
*G06N 3/082*   (2023.01)
*G06V 10/82*   (2022.01)

(52) U.S. Cl.
CPC ......... *G06V 10/774* (2022.01); *G05D 1/0088* (2013.01); *G06N 3/082* (2013.01); *G06V 10/82* (2022.01)

(58) Field of Classification Search
None
See application file for complete search history.

(56) References Cited

U.S. PATENT DOCUMENTS

| 11,983,246 B2* | 5/2024 | Kurauchi | G06V 10/82 |
| 2019/0034781 A1* | 1/2019 | Asano | G06N 5/04 |
| 2022/0180199 A1* | 6/2022 | Xu | G06V 10/82 |

FOREIGN PATENT DOCUMENTS

| JP | H07-093160 A | 4/1995 |
| JP | H08-314880 A | 11/1996 |
| JP | 2005-100121 A | 4/2005 |

OTHER PUBLICATIONS

International Search Report for Application No. PCT/JP2020/040924 dated Dec. 28, 2020.

* cited by examiner

*Primary Examiner* — Delomia L Gilliard
(74) *Attorney, Agent, or Firm* — Volpe Koenig

(57) ABSTRACT

When it is assumed that a large-scale Deep Neural Network for autonomous driving applied compression, there are problems of a decrease in recognition accuracy of a post-compression Neural Network (NN) model and an increase in a compression design period, due to a large number of harmful or unnecessary training images (invalid training images). A training image selection unit B100 calculates an influence value on an inference, and generates an indexed training image set 1004-1 necessary for an NN compression design, by using the influence value. A neural network compression unit P200 notified of the result via a memory P300 compresses the NN.

15 Claims, 21 Drawing Sheets

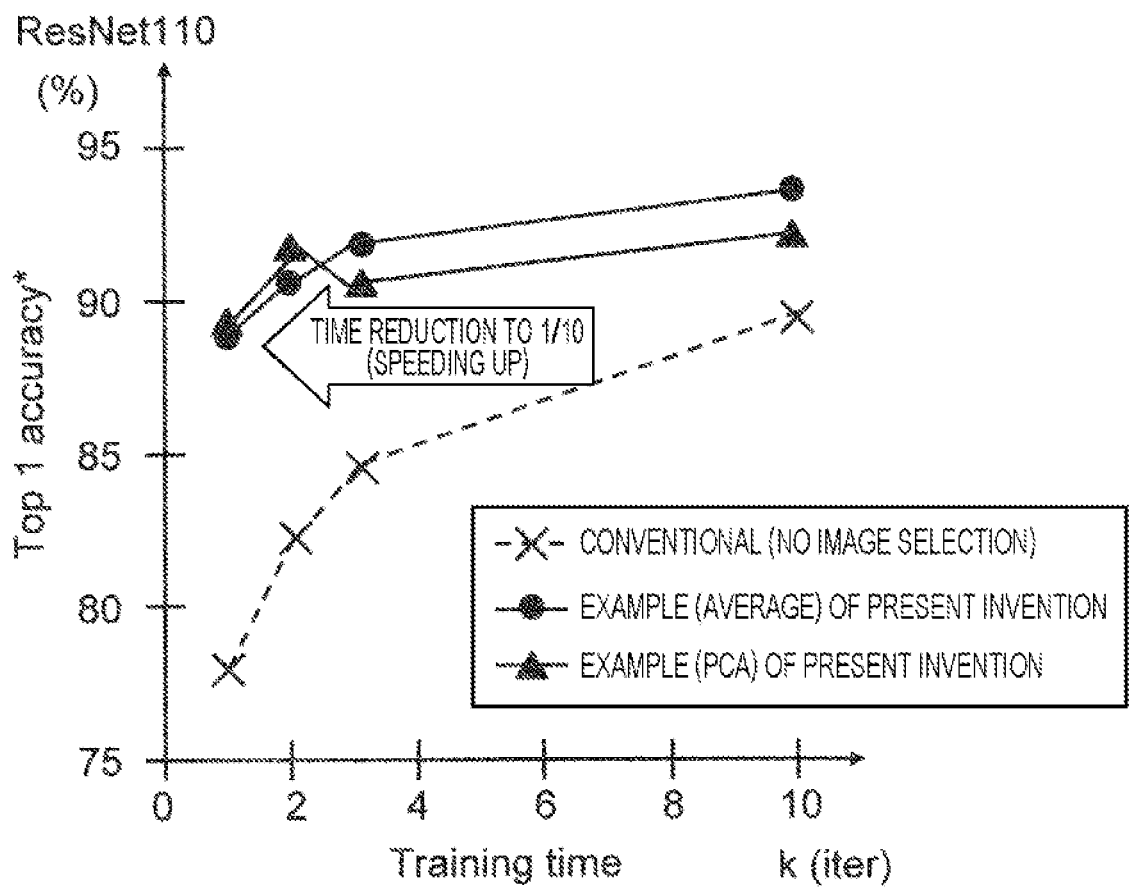

NEURAL NETWORK COMPRESSION DEVICE AND METHOD FOR SAME

TECHNICAL FIELD

The present invention relates to compression of a neural network. In the specification of the present application, the compression means reduction of an arithmetic operation amount.

BACKGROUND ART

In the brain of an organism, there are a large number of neurons (nerve cells), and each neuron performs a motion such as an input of a signal from a large number of other neurons and an output of a signal to a large number of other neurons. An attempt to realize such a brain mechanism by a computer is a Deep Neural Network (DNN), which is an engineering model that mimics the behavior of a biological nerve cell network.

As an example of the DNN, there is a convolutional neural network (CNN) valid for object recognition and behavior prediction. FIG. 1 illustrates an example of a structure of a CNN. The CNN includes an input layer, one or more intermediate layers, and multilayer convolution operation layer called an output layer. In the N-th convolution operation layer, a value output from the (N−1)th layer is used as an input, and a result obtained by convolving a weight filter with the input value is output to the input of the (N+1)th layer. At this time, it is possible to obtain high generalization performance by setting (training) the kernel coefficient (weight coefficient) of the weight filter to an appropriate value in accordance with an application.

In recent years, by mounting a CNN on an in-vehicle electronic control unit (ECU), development of a technology for realizing autonomous driving and driving support has been accelerated. The arithmetic operation amount required to implement a large-scale CNN for autonomous driving is 100 TOPs (Tera Operations) or more. On the other hand, the arithmetic capability of a processor that can be mounted on an autonomous driving-electronic control unit (AD-ECU) being one kind of in-vehicle ECU is about several 10 TOPS (Tera Operation per Sec), and it is difficult to implement real-time processing. Thus, as illustrated in FIG. 2, it is necessary to reduce (compress) the arithmetic operation amount of the CNN. However, it takes a long period to make a compression design for searching for a compression condition capable of achieving both suppression of a decrease in recognition accuracy due to compression and adaptation to the arithmetic capability of the in-vehicle processor. From the above viewpoint, in the known compression design method, it is difficult to achieve both (1) suppression of a decrease in recognition accuracy in compression and (2) shortening of a compression design period, with respect to a large-scale CNN for autonomous driving.

CITATION LIST

Patent Literature

PTL 1: JP 2005-100121 A In PTL 1, the type of the feature and an identification condition used in identification processing are determined in accordance with a desired balance between the identification accuracy and the burden of the calculation amount. PTL 1 discloses that an identification accuracy specifying unit and a calculation amount specifying unit respectively specify an identification accuracy index value and a calculation amount index value, and select a favorable discriminator.

SUMMARY OF INVENTION

Technical Problem

Here, FIG. 5 illustrates a conventional compression design flow. This processing is executed by a conventional neural network compression device.

First, a training data set 1001 is received as an input, and an initial compression condition including a compression location and a compression rate for a pre-compression neural network model (pre-compression NN model) 1003 is determined (S3). Then, adjustment reflecting an optimum compression condition is performed on the initial compression condition, to calculate a compression condition 1005 (S4). Compressing processing is executed by using the compression condition 1005 (S5). Therefore, the provisional compression neural network model (provisional compression NN model) 1006 is specified. Then, re-training (tuning) is executed by using the provisional compression NN model and the training data set 1001 (S7). It is determined whether the re-training (S6) of the last training data set 1001 and an inference data set 1002 has ended (S7). As a result, if the re-training has ended, the result of the re-training is stored as a post-compression neural network model (post-compression NN model) 1007. If the re-training has not ended, optimum compression condition search processing is executed on the result of the re-training (S8). Then, an optimum compression condition that is the result of the optimum compression condition search processing is used in S4.

When such processing is performed, there are problems as follows. For example, in-vehicle sensor data and the training data set include a large number of images that induce erroneous recognition in inference using the post-compression NN model 1007. Such images are represented by, for example, an image including a minor invisible noise that induces erroneous recognition added by an accidental or malicious third party attack or an image lacking generalizability mapping a limited special environment. In the conventional CNN compression design, the harmful images (invalid training image) are included in the training images used for compression. Thus, (1) a decrease in recognition accuracy of the post-compression DNN model and (2) prolongation of a compression design due to the enormous number of training images have been problems.

Solution To Problem

In order to solve the above problem, in the present invention, a training data set is classified into valid training data necessary or valid for a compression design and invalid training data unnecessary or harmful, and training regarding a data compression design using at least one of the valid training data and the invalid training data is executed in accordance with a result of the classification.

More specifically, there is provided a neural network compression device that compresses a neural network by using a training data set that has been input. The neural network compression device includes a training image selection unit that calculates an influence value on an inference result calculated by using an inference data set and a neural network model for the training data set, that classifies the training data set into valid training data necessary for the compression and invalid training data unnecessary for the compression, based on the influence value, and that generates an indexed training data set, and a neural network compression unit that compresses the neural network model based on the indexed training data set and the neural network model. Furthermore, the present invention also includes a compression method in the neural network compression device.

Advantageous Effects of Invention

According to the present invention, it is possible to perform repetitive training (re-training) capable of improving recognition performance such as accuracy and shortening of a training time.

BRIEF DESCRIPTION OF DRAWINGS

FIG. 7 is a diagram for explaining determination of an initial compression condition by using training image selection.

FIG. 8 is a diagram illustrating an effect of shortening a training time in the embodiment of the present invention.

DESCRIPTION OF EMBODIMENTS

Figure 5:
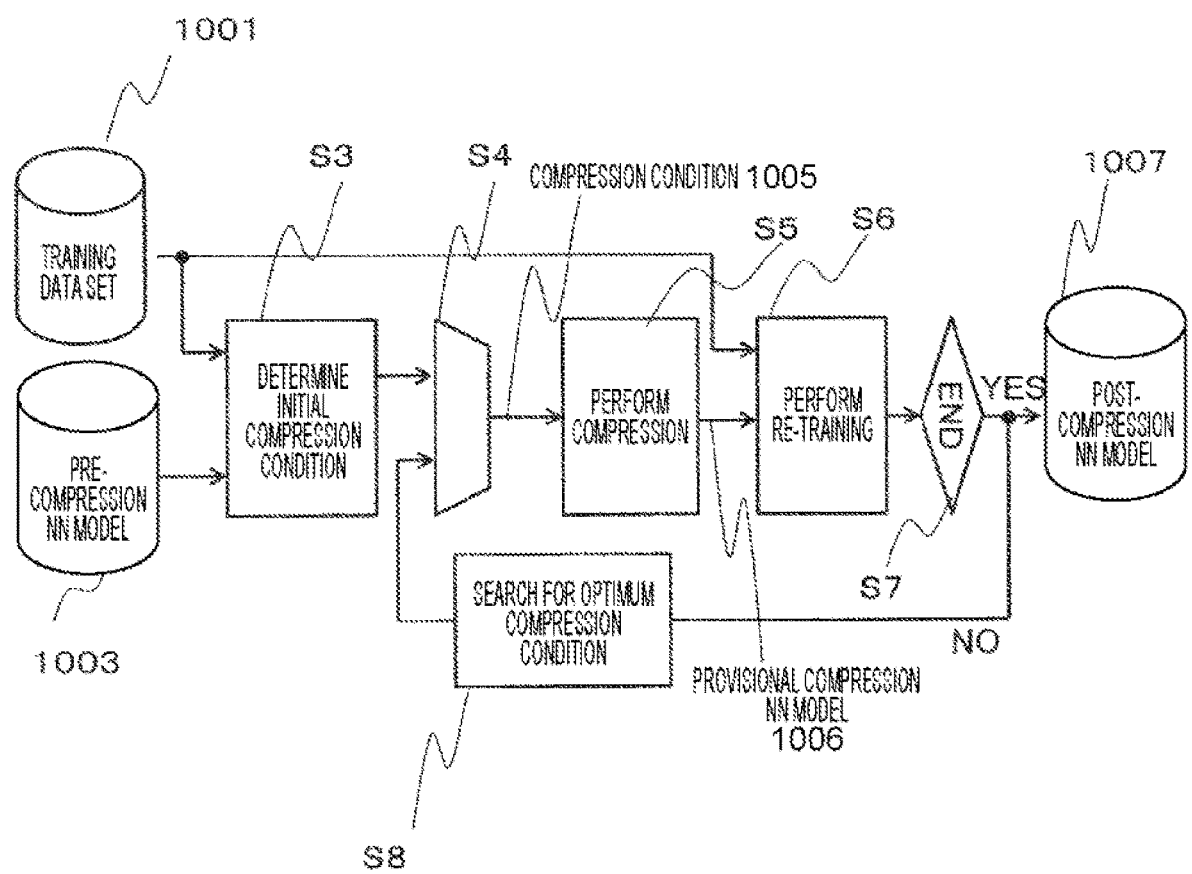
FIG. 5 is a diagram illustrating a conventional compression design flow.
Figure 6:
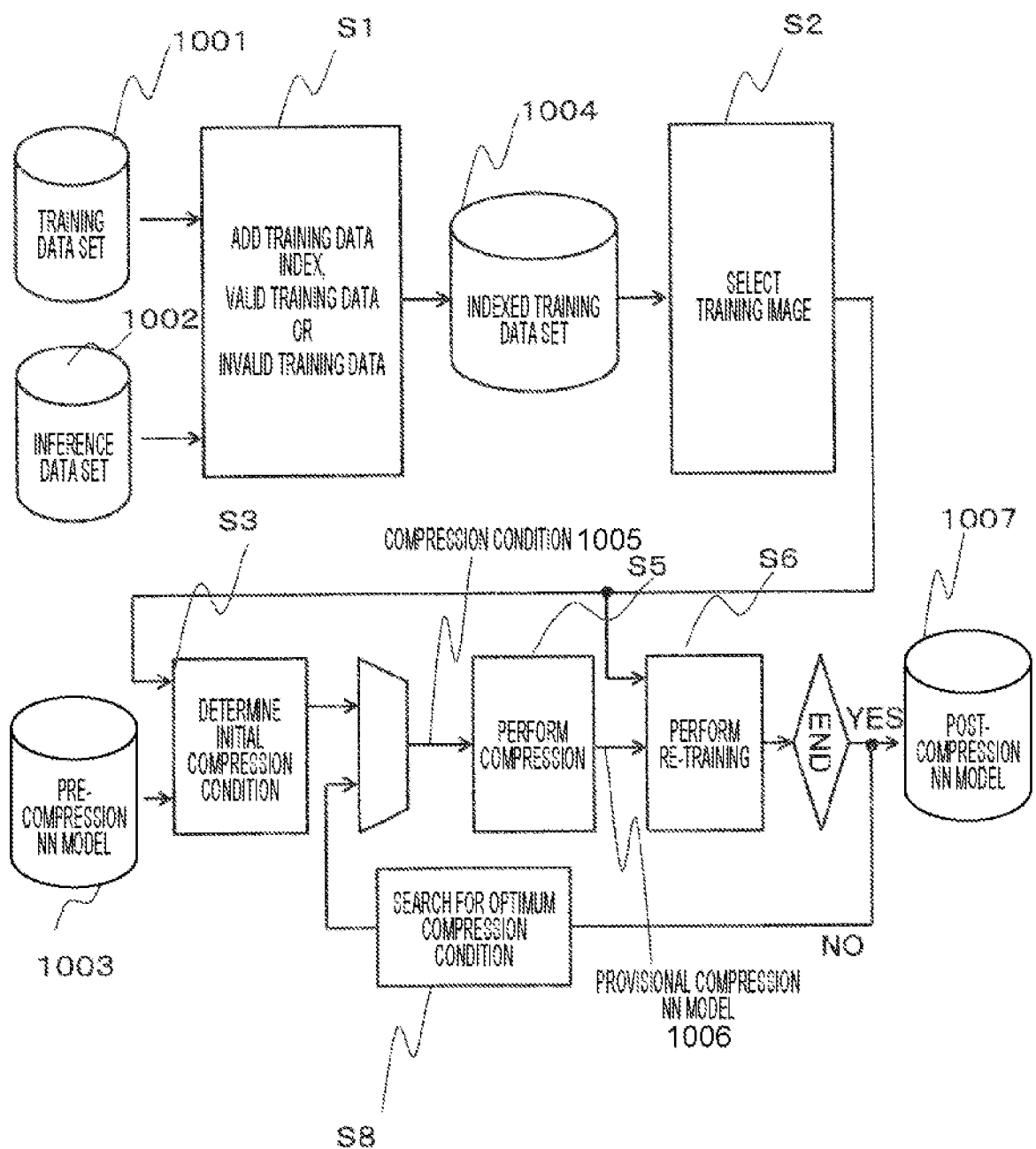
FIG. 6 is a diagram illustrating a compression design flow in each embodiment of the present invention.

Hereinafter, before description of each Embodiment (1 to 5) of the present invention, a compression design flow common to the embodiments of the present invention will be described with reference to FIG. 6. This processing flow is executed by a neural network compression device 212 described later. Reference signs common to the reference signs in FIG. 5 indicate similar processing or data. Here, the similarity includes processing or data that is not completely the same depending on the performed processing or used data.

First, an influence value of each piece of data included in a training data set 1001 on an inference result is estimated by using the training data set 1001 that has been input and an inference data set 1002. Each piece of training data is classified into valid training data or invalid training data, and an indexed training data set 1004 is created (S1). As generation of the indexed training data set 1004, for example, an index is added. The assignment of the index is assignment to at least one. In a form of assigning the index to one (for example, valid), it is possible to determine a training data set to which no index is assigned, to be the other (for example, invalid). As another example, it is also possible to realize the classification by storing the classification result in a storage medium of an address corresponding to the result.

Then, the valid training data is selected based on the index of the indexed training data set 1004 (S2). An initial compression condition for a pre-compression neural network model (pre-compression NN model) 1003 is determined by using the selected valid training data (S3). Here, in the initial compression condition determination (S3), the index may be used. Specifically, as illustrated in FIG. 7, a priority order of compression is determined for each neuron based on the index and an activation state. The compression of each neuron is repeated in descending order of priority until the post-compression NN model 1007 satisfies an arithmetic operation amount constraint set by a user. Here, the activation of the neuron indicates that the neuron takes a non-zero value.

To summarize the above description, compression is performed to remove a neuron having a low valid training image and a high invalid training image. A neuron in which both the valid training image and the invalid training image are low is also removed. In addition, if the valid training image is high, the compression of the neuron is not observed regardless of the activation frequency for the invalid training image. Furthermore, it is desirable to compress the corresponding neuron in accordance with the priority illustrated in this drawing. As described above, it is more preferable to perform compression by using a combination of the activation frequencies of neurons of the valid training image and the invalid training image. Here, high and low can be performed by comparison with a predetermined reference value. Furthermore, in this drawing, only the results of the compression priorities 1 and 2 may be used.

Then, adjustment reflecting an optimum compression condition is performed on the initial compression condition, to calculate a compression condition 1005 (S4). Compressing processing is executed by using the compression condition 1005 (S5). Thus, a provisional compression NN model 1006 is specified.

Then re-training is executed by using the provisional compression NN model 1005 and 1006 and the selected valid training image (S6). It is determined whether the re-training (S6) of the last training data set 1001 and an inference data set 1002 has ended (S7). As a result, if the re-training has ended, the result of the re-training is stored as a post-compression neural network model (post-compression NN model) 1007. If the re-training has not ended, optimum compression condition search processing is executed on the result of the re-training (S9). Then, an optimum compression condition that is the result of the optimum compression condition search processing is used in S4.

In each of the following embodiments, an image is used as a training data set, but each of the embodiments can also be applied to other types of data.

The embodiments of the present invention will be described below with reference to the drawings.

Embodiment 1

An outline configuration and an outline processing flow of Embodiment 1 will be described with reference to FIGS. 10 and 11.

Figure 10:
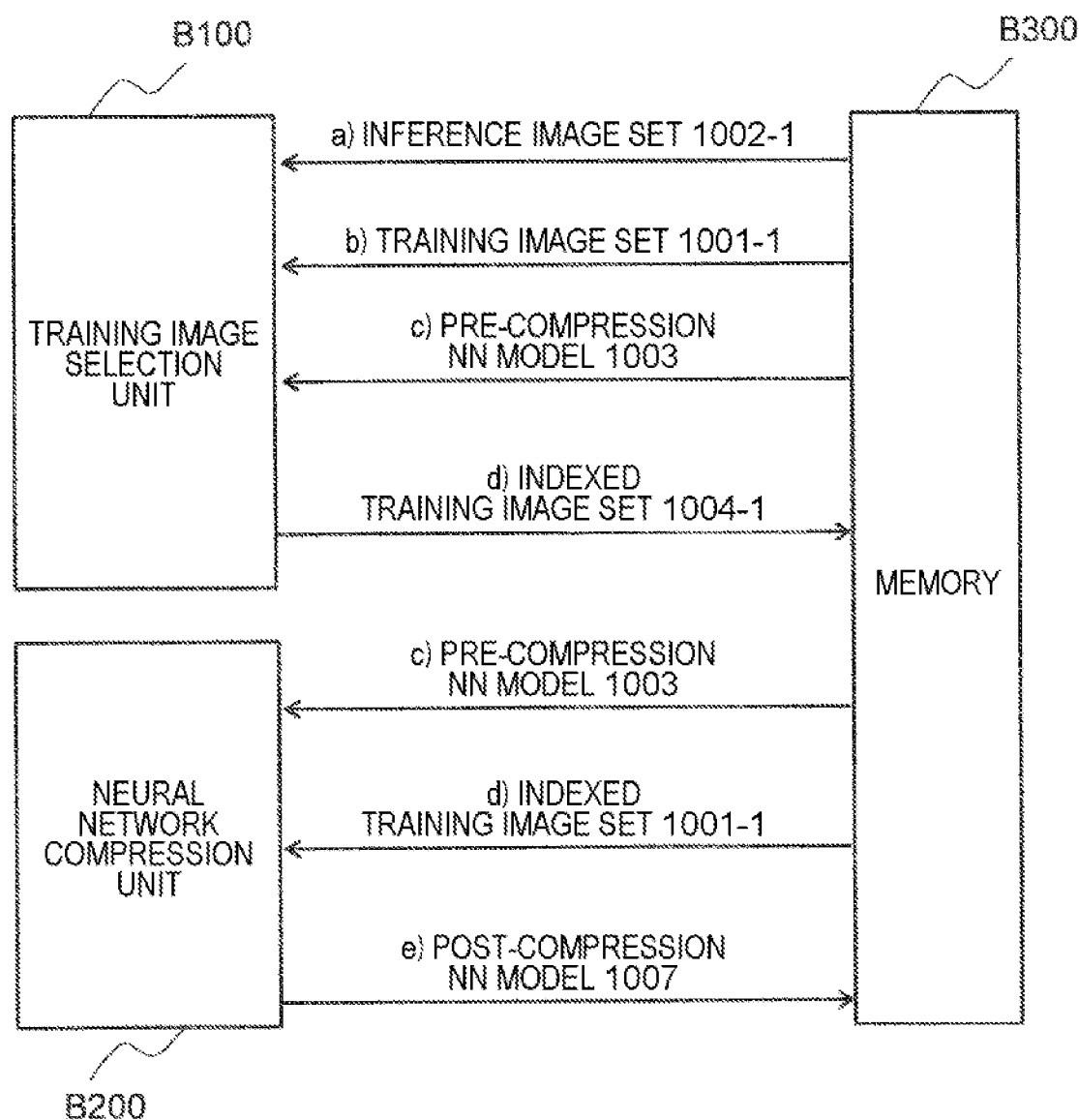
FIG. 10 is an overall configuration diagram of an NN compression device 121 in Embodiment 1.
Figure 11:
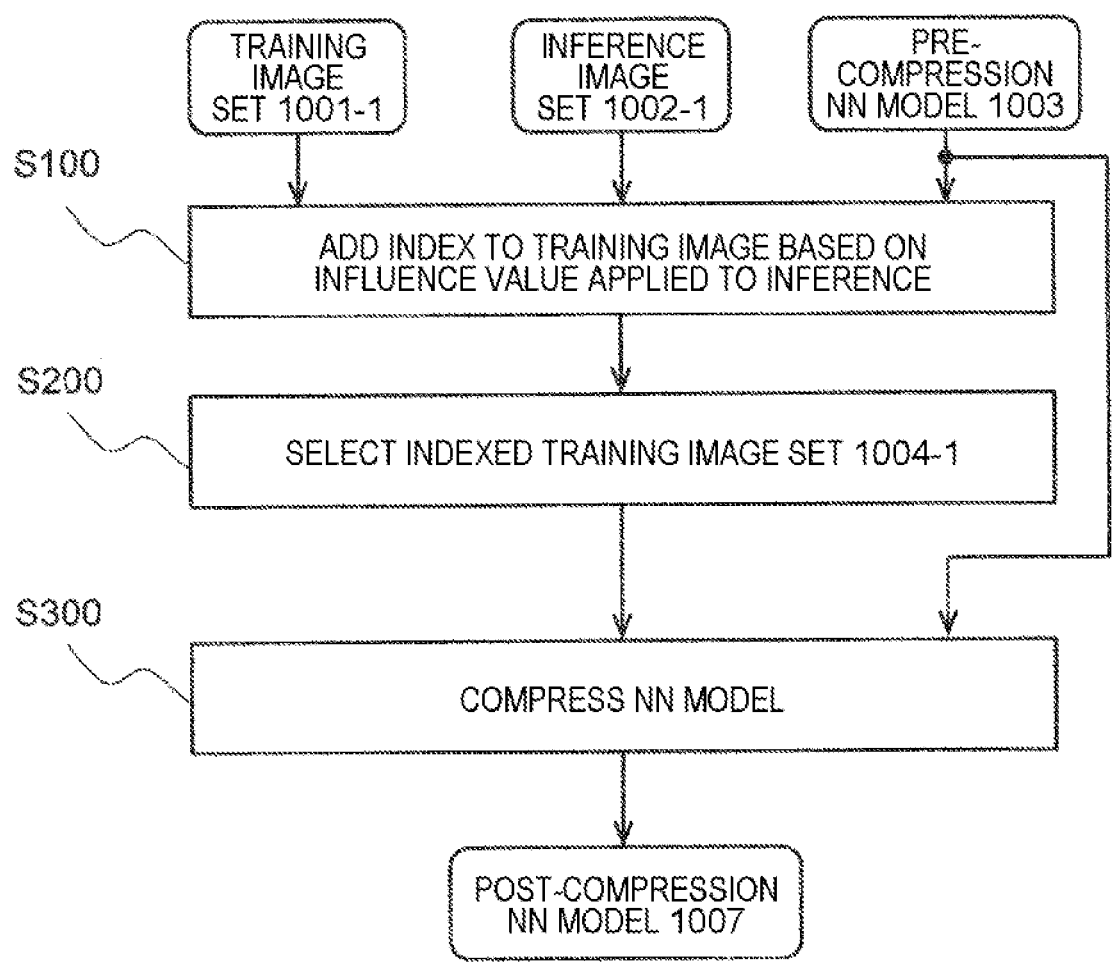
FIG. 11 is a schematic diagram illustrating a processing flow of Embodiment 1.

First, FIG. 10 illustrates each component requirement constituting a neural network compression device (NN compression device 121) in the present embodiment. As illustrated in FIG. 10, the neural network compression device includes a training image selection unit B100, a neural network compression unit (NN compression unit) B200, and a memory B300.

The neural network compression device can be mounted on an arithmetic operation device. For example, it can be realized as a field-programmable gate array (FPGA) mounted on an integrated circuit. In addition, each component and submodule described later may be realized as hardware or may be realized as software (program). Processing will be described below.

Next, an outline processing flow of Embodiment 1 will be described with reference to FIG. 11.

First, in Step S100, the training image selection unit B100 receives a training image set 1001-1, an inference image set 1002-1, and a pre-compression NN model 1003 from the memory B300. The training image selection unit B100 generates an indexed training image set 1004-1 from the received data. This process corresponds to Step S1 in FIG. 6.

An example in which training target data is an image will be described below in each embodiment. Therefore, the training image set 1001-1 is one type of the training data set 1001 in FIG. 6. Furthermore, the inference image set 1002-1 is one type of the inference data set 1002 in FIG. 6. The training image set 1001-1 includes a plurality of training images, and the inference image set 1002-1 includes a plurality of inference images.

In Step S200, the training image selection unit B100 selects a valid training image 1008 from the indexed training image set 1004-1. This process corresponds to Step S2 in FIG. 6. This process corresponds to Step S2 in FIG. 6.

In Step S300, the NN compression unit B200 receives the indexed training image set 1004-1 and the pre-compression NN model 1003 from which the valid training image 1008 has been selected, and then performs compression processing. This corresponds to S3 to S8 in FIG. 6.

Next, a detailed configuration and a detailed flow of Embodiment 1 will be described.

Figure 12:
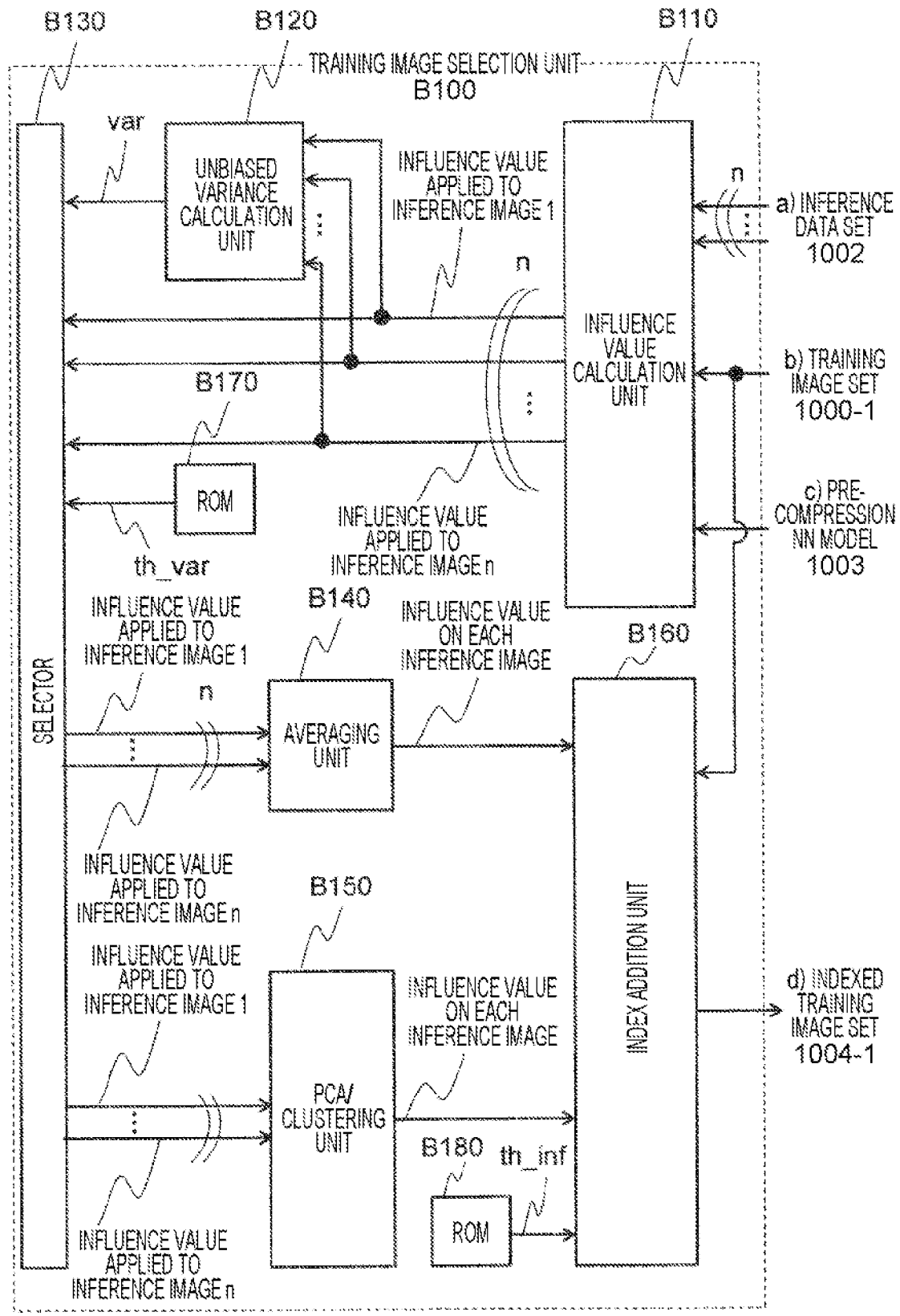
FIG. 12 is a diagram illustrating a configuration of a training image selection unit B100 in Embodiment 1.

FIG. 12 is a diagram illustrating a configuration of the training image selection unit B100. The training image selection unit B100 includes the following submodules. B110 is an influence value calculation unit B110 that calculates an influence value from the training image set 1001-1, the inference data set 1002, and the pre-compression NN model 1003. B120 is an unbiased fraction calculation unit B120 that calculates an unbiased variance by using the input from the influence unit calculation unit B110. B130 is a selector B130 that selects a submodule that executes processing on the input data. B140 is an averaging unit B140 that calculates an average value of the input data. B150 is a PCA/clustering unit B150 that executes clustering processing on the input data. B160 is an index addition unit B160 that assigns an index to or classifies the training image. B170 and B180 are read only memories (ROMs) B170 and B180 that store data.

Figure 13:
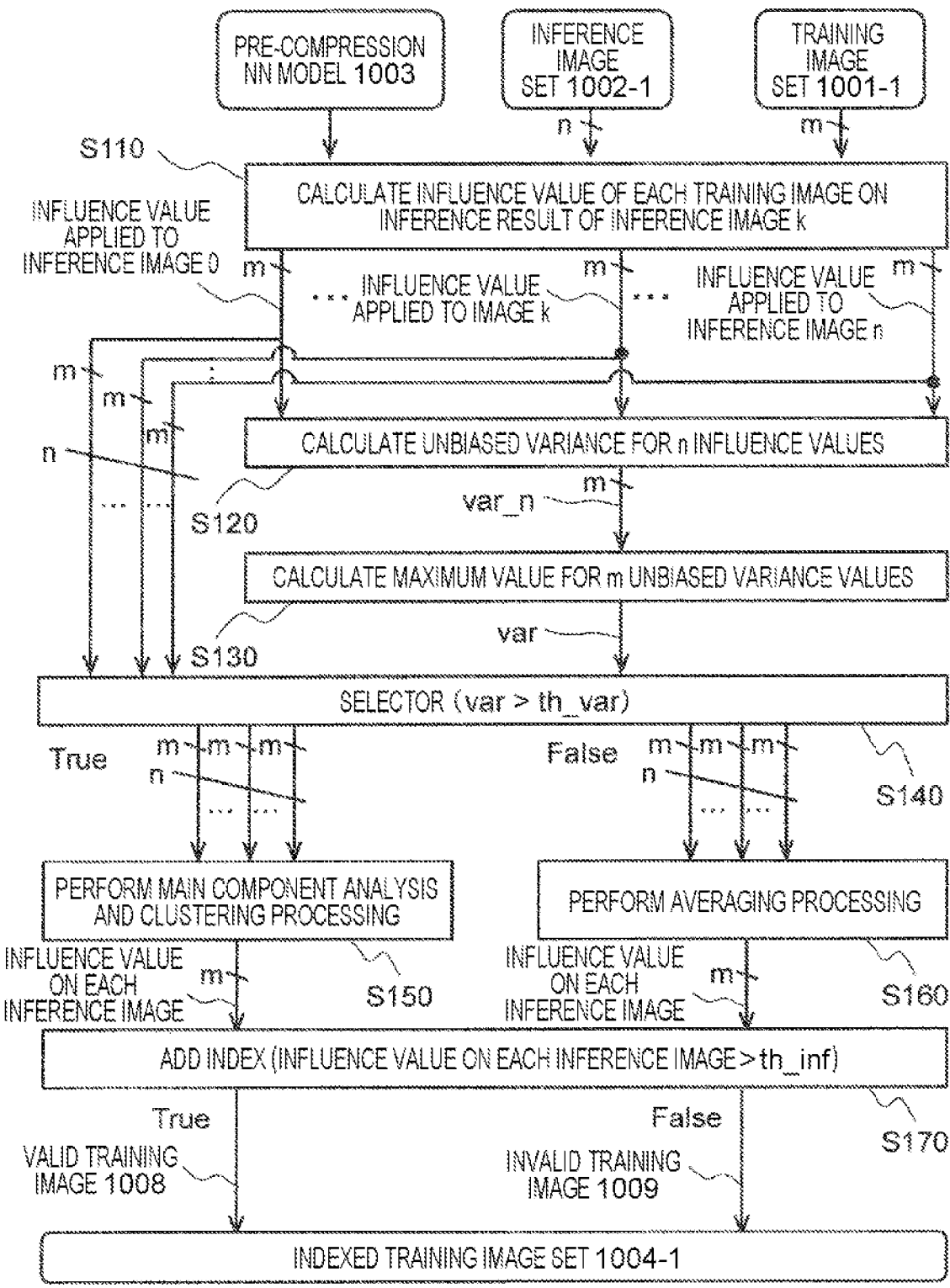
FIG. 13 is a diagram illustrating a processing flow of the training image selection unit B100 in Embodiment 1.

With such submodules, the training image selection unit B100 executes the following processing. FIG. 13 illustrates the contents.

In S110, the influence value calculation unit B110 receives the pre-compression NN model 1003, the inference data set 1002, and the training image set 1001-1. The influence value calculation unit B110 calculates the influence value of each training image included in the training image set 1001-1 on the inference result of an inference image k and outputs the influence value as the influence value on the inference image k.

Then, in S120, the unbiased variance calculation unit B120 receives the influence value on the inference image k calculated in S110, and calculates the unbiased variance of the influence value for a difference in the inference image. In S130, the unbiased variance calculation unit S120 calculates the maximum value of the unbiased variance calculated in S120.

Then, in S140, the selector B130 selects the submodule to which the influence value on the inference image k is transmitted, based on the maximum value of the unbiased variance calculated in S130. Specifically, when the maximum value var of the unbiased variance is more than a certain threshold value th_var read from the ROM B180, the PCA/clustering unit B150 is selected. On the other hand, when the maximum value var of the unbiased variance is equal to or less than the certain threshold th_var read from the ROM B180, the averaging unit B140 is selected.

Then, in S150, the PCA/clustering unit (B150) calculates the influence value on each inference image by applying a main component analysis and clustering processing to the influence value on the inference image k calculated in S110. The calculation of the influence value here is more preferably executed for all the inference images.

In S160, the averaging unit (B140) calculates the influence value on each inference image by applying averaging processing to the influence value on the inference image k calculated in S110. The calculation of the influence value here is more preferably executed for all the inference images.

Then, in S170, the index addition unit B160 classifies each training image into the valid training image 1008 or the invalid training image 1009 based on the influence value calculated in S150 or S160. Such classification may be realized by adding an index indicating whether the image is the valid training image 1008 or the invalid training image 1009. As a result, the index addition unit B160 performs an output as the indexed training image set 1004-1. Specifically, when the influence value on each inference images is more than a threshold value th_inf read from the ROM B180, the image is determined as the valid training image 1008. Conversely, when the influence value is equal to or less than the threshold value th_inf, the image is determined as the invalid training image 1009. Here, the invalid training image 1009 refers to a training image with poor generalization or a training image to which noise inducing erroneous determination by a malicious third party is added. The valid training image 1008 refers to an image that does not belong to the invalid training image 1009 among the training images.

Figure 14:
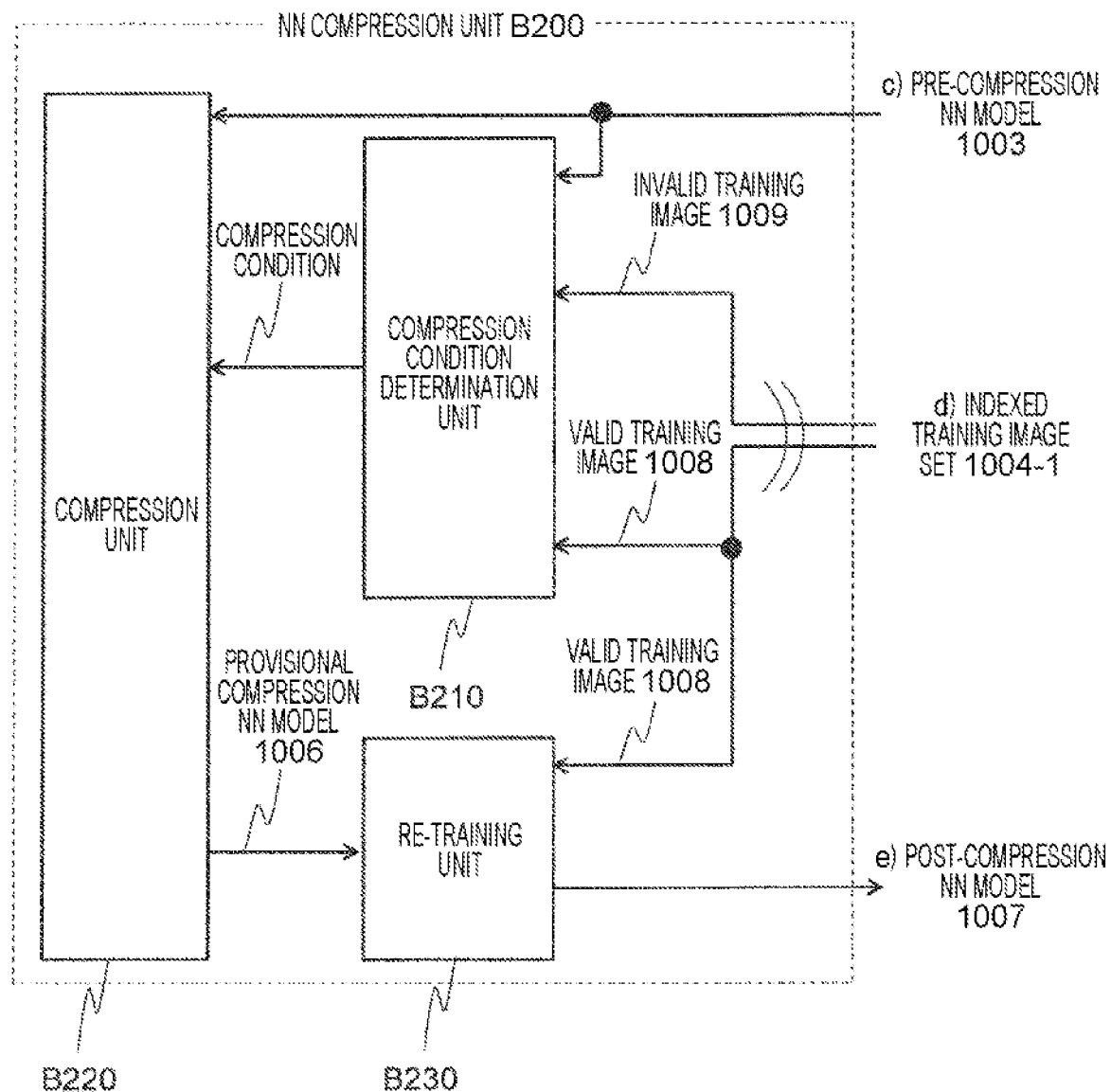
FIG. 14 is a diagram illustrating a configuration of a neural network compression unit B200 in Embodiment 1.
Figure 15:
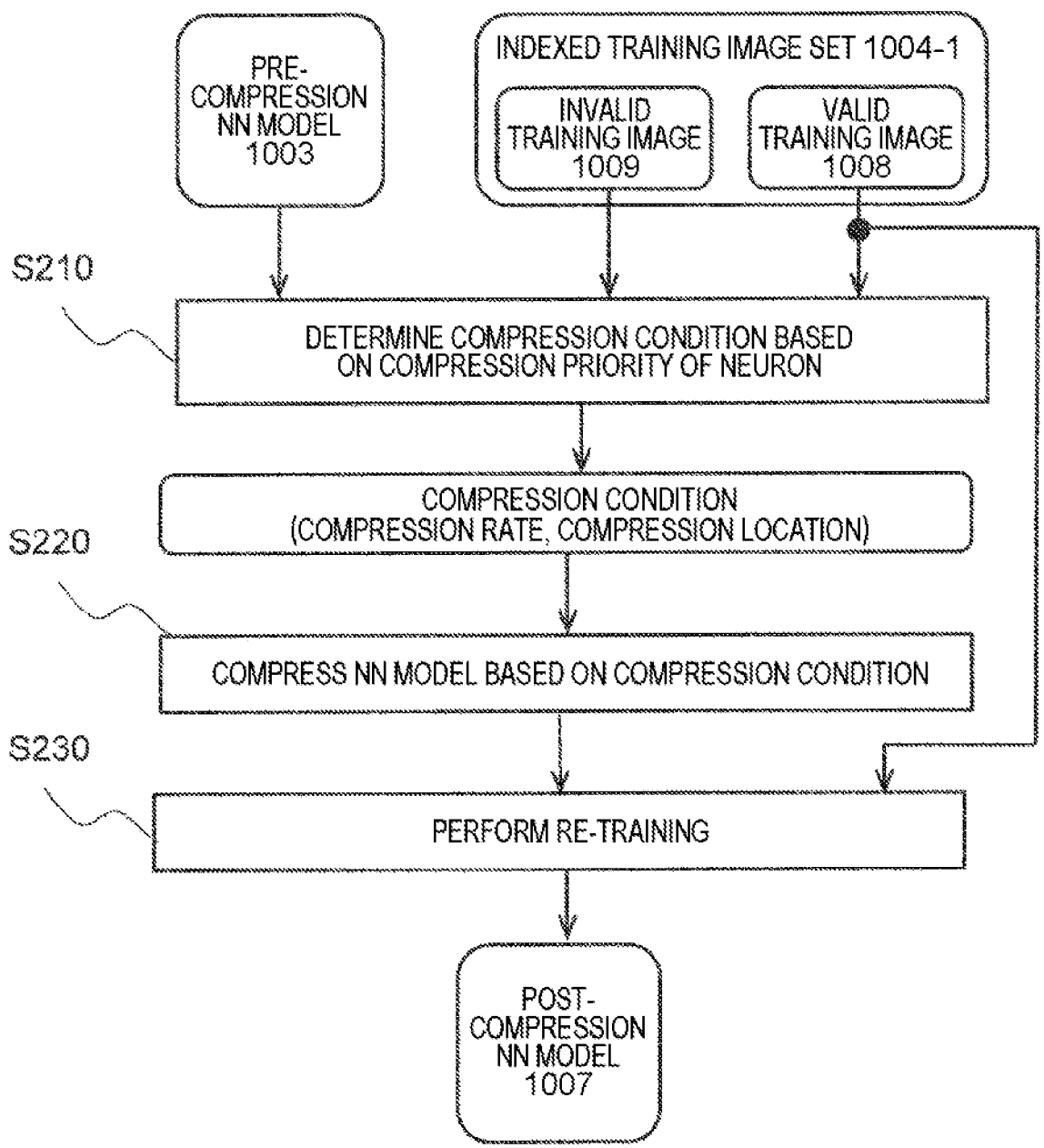
FIG. 15 is a diagram illustrating a processing flow of the neural network compression unit B200 in Embodiment 1.

Next, a configuration and a detailed processing flow of the compression unit B200 will be described with reference to FIGS. 14 and 15.

First, the detailed configuration of the NN compression unit B200 will be described with reference to FIG. 14. The NN compression unit B200 executes Step S3 in FIG. 6. The NN compression unit B200 also includes the following submodules. B210 is a compression condition determination unit B210 that determines a compression condition from the invalid training image 1009 and the valid training image 1008. B220 is a compression unit B220 that executes compression processing in accordance with the compression condition. B203 is a re-training unit B230 that inputs the valid training image 1008 and executes re-training by using the provisional compression NN model 1006.

With such submodules, the NN compression unit B200 executes the following processing. FIG. 15 illustrates the contents.

In Step S210, the compression condition determination unit B210 receives the pre-compression NN model 1003 and the indexed training image set 1004-1 including the invalid training image 1009 and the valid training image 1008. The compression condition determination unit B210 determines the compression condition including a compression location and a compression rate based on the compression priority of the neuron.

Then, in S220, the compression unit B220 executes compression of the NN model by using the compression condition determined in Step S210. As a result, the compression unit B220 outputs a provisional compression NN model.

Then, in Step S230, the re-training unit B230 re-trains the provisional compression NN model output in S220 by using the valid training image 1008. As a result, the post-compression NN model 1007 is output.

Figure 16:
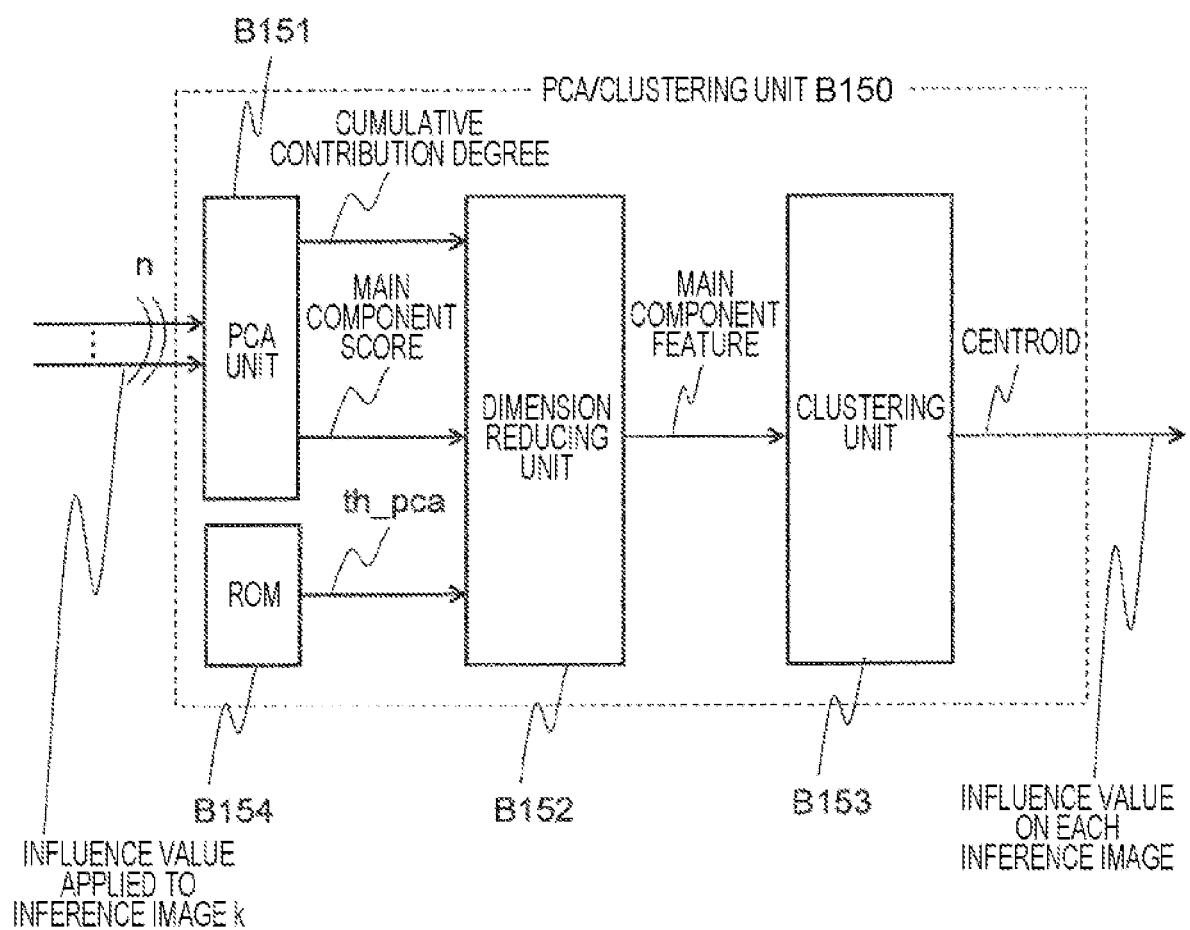
FIG. 16 is a diagram illustrating a configuration of a PCA/clustering unit B150 in Embodiment 1.
Figure 17:
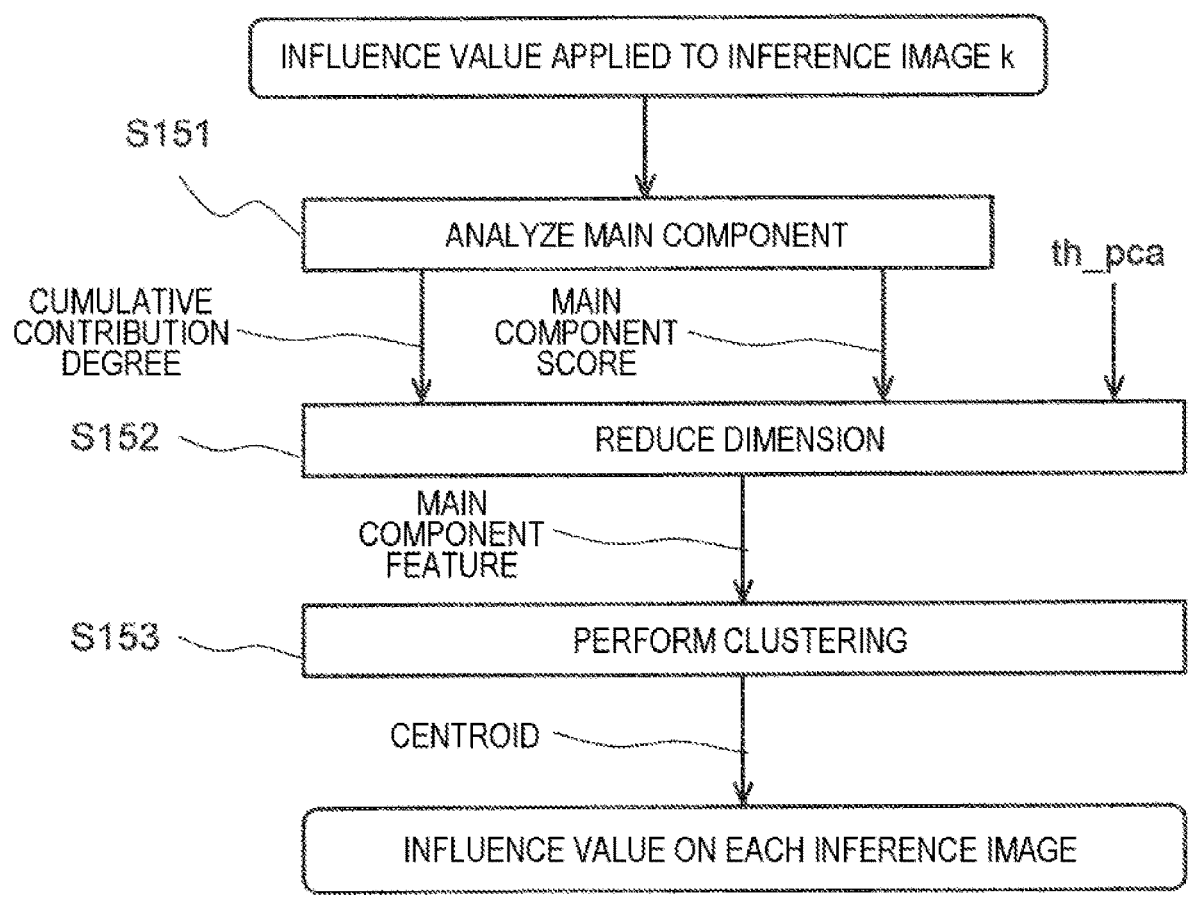
FIG. 17 is a diagram illustrating a processing flow of the PCA/clustering unit B150 in Embodiment 1.

Next, a configuration and a detailed processing flow of the PGA/clustering unit B150 will be described with reference to FIGS. 16 and 17.

First, submodules constituting the PCA/clustering unit B150 will be described with reference to FIG. 16. B151 is a PCA unit B151 that receives the influence value and outputs the cumulative contribution degree and the main component score. B152 is a dimension reducing unit B152 that calculates the main component feature by using the cumulative contribution degree, the main component score, and th_pca that is the lower limit value (threshold value) of the contribution degree. B153 is a clustering unit B153 that receives the main component feature and calculates the center of the main component feature as an influence value for each inference image by clustering processing. A ROM B154 stores th_pca.

Next, a detailed processing flow of the PCA/clustering unit B150 will be described with reference to FIG. 17.

First, in Step S151, the PCA unit B151 receives the influence value on the inference image k and outputs the cumulative contribution degree and the main component score.

Then, in Step S152, the dimension reducing unit B152 receives the cumulative contribution degree and the main component score output in Step S151 and the lower limit value th_pca of the cumulative contribution degree read from the ROM B154. The dimension reducing unit B152 performs dimension reduction within a range in which the cumulative contribution degree does not fall below the lower limit value th_pca, and outputs the main component feature.

Then, in Step S153, the clustering unit B153 performs clustering on the main component feature. At this time, the centroid of each cluster is output as an influence value for each inference image. The influence value for each inference image may be an influence value for all the inference images.

Then, a configuration and a detailed processing flow of the compression condition determination unit B200 constituting the NN compression unit B210 will be described with reference to FIGS. 18 and 19.

Figure 18:
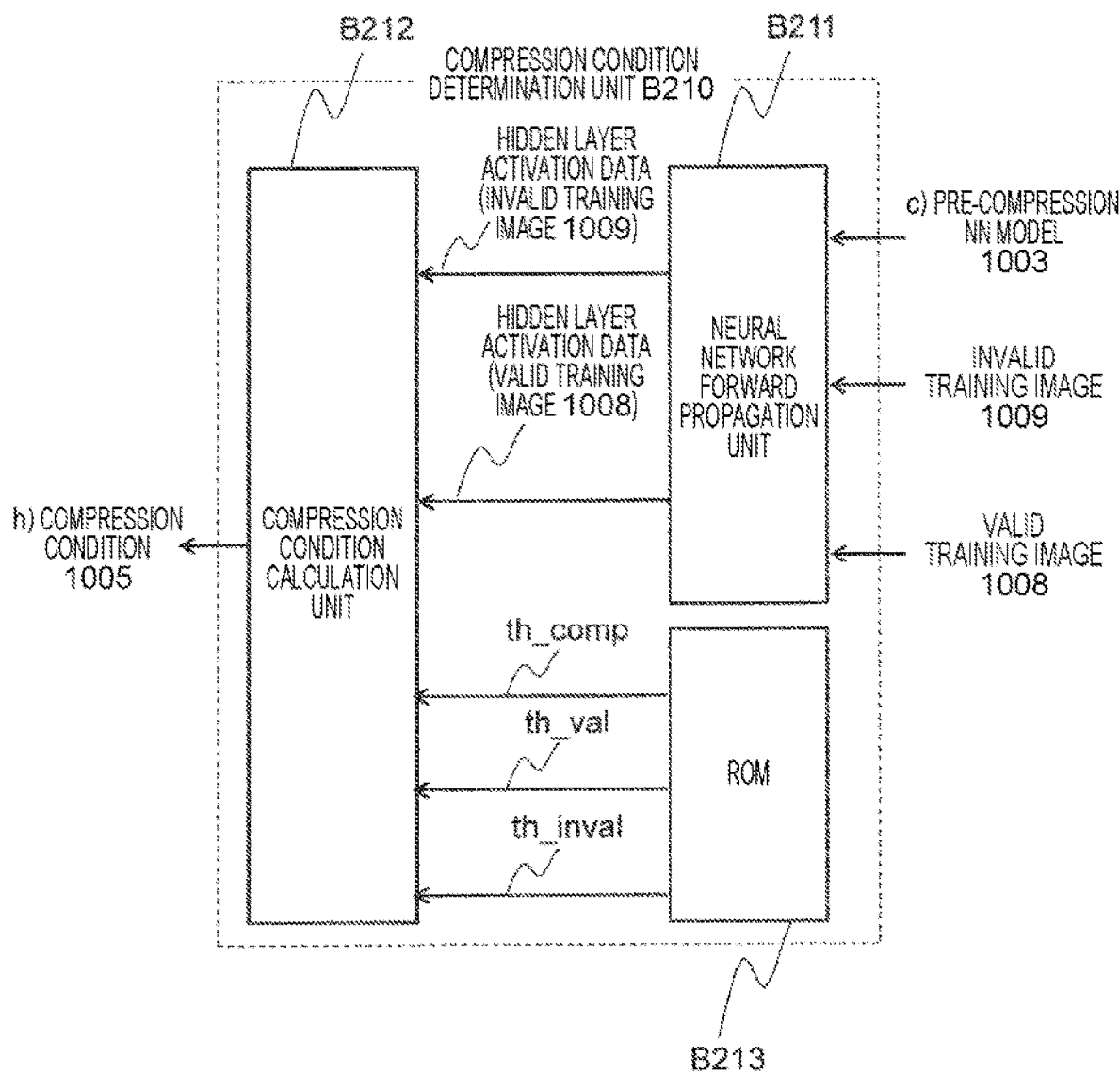
FIG. 18 is a diagram illustrating a configuration of a compression condition determination unit B210.

First, FIG. 18 illustrates submodules constituting the compression condition determination unit B210. B211 is a neural network forward propagation unit B211 that receives the pre-compression NN model 1003, the invalid training image 1009, and the valid training image 1008, and outputs hidden layer activation data. B212 is a nest y nine-combination condition calculation unit B212 that inputs the hidden layer activation data and each threshold value (th_) and outputs the compression condition 1005. B213 is a ROM B213 that stores each threshold value.

Figure 19:
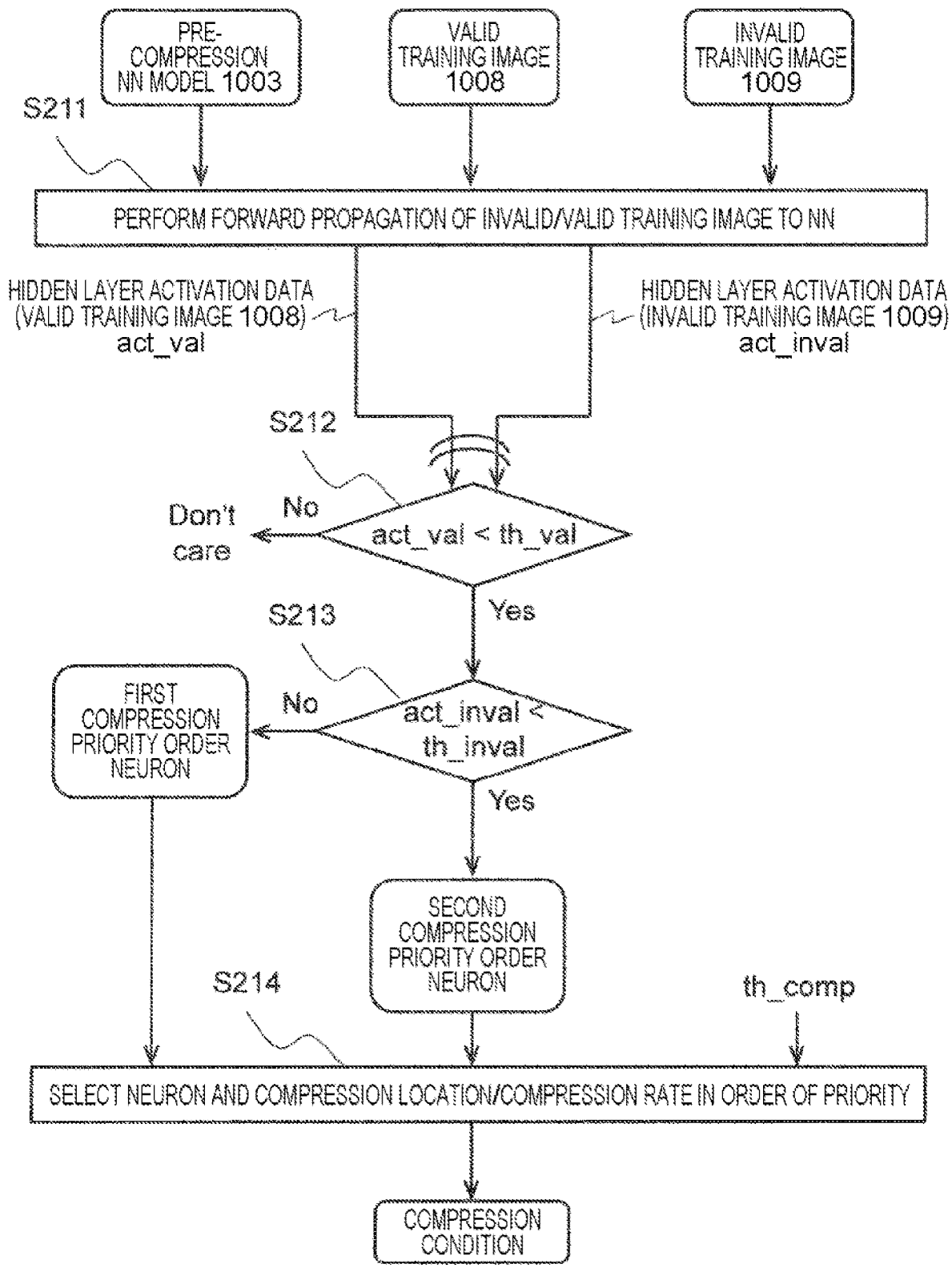
FIG. 19 is a diagram illustrating a processing flow of the compression condition determination unit B210.

Next, FIG. 19 illustrates a detailed processing flow of the compression condition determination unit B210.

In Step S211, the neural network forward propagation unit B211 receives the pre-compression NN model 1003, the valid training image 1008, and the invalid training image 1009. The neural network forward propagation unit B211 causes each of the valid training image 1008 and the invalid training image 1009 to be separately propagated forward to the NN. Therefore, the neural network forward propagation unit B211 outputs hidden layer activation data act_val at the time of valid training image propagation and hidden layer activation data act_inval at the time of invalid training image propagation, respectively. Here, the hidden layer activation data indicates a frequency at which neurons constituting a hidden layer take a non-zero value.

Then, in Step S212 and S213, the compression condition calculation unit B212 determines the relationship between the hidden layer activation data and the threshold value. Specifically, in Step S212, when act_val is equal to or more than a certain threshold value th_val, the processing proceeds to the process of S213. When act_val is less than the certain threshold value th_val, don't care is set (the processing is ended). In Step S213, when act_val is less than a certain threshold value th_inval, the compression condition calculation unit B212 determines the neuron as a first compression priority order neuron. Conversely, when act_inval is equal to or more than the certain threshold value th_inval, the neuron determined as a second compression priority order neuron. The processing order of Steps S212 and S213 is not limited. That is, Step S213 may be processed first, or both steps may be processed in parallel.

Then, in Step S214, the compression condition calculation unit B212 receives the first compression priority order neuron and the second compression priority order neuron. The compression condition calculation unit B212 sets each neuron as a compression target neuron in descending order of priority, and outputs the compression condition including the compression location and the compression rate.

Embodiment 2

Next, Embodiment 2 will be described. Embodiment 2 is different from Embodiment 1 in that the threshold value th_inf input to the index addition unit B160 of the training image selection unit B100 is automatically determined.

Figure 1:
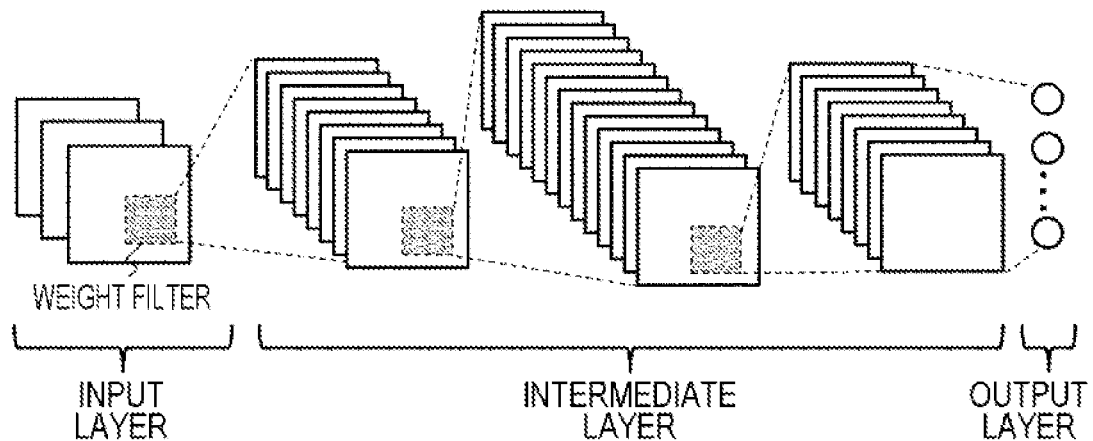
FIG. 1 is a diagram illustrating a structure of a convolutional neural network (CNN).
Figure 20:
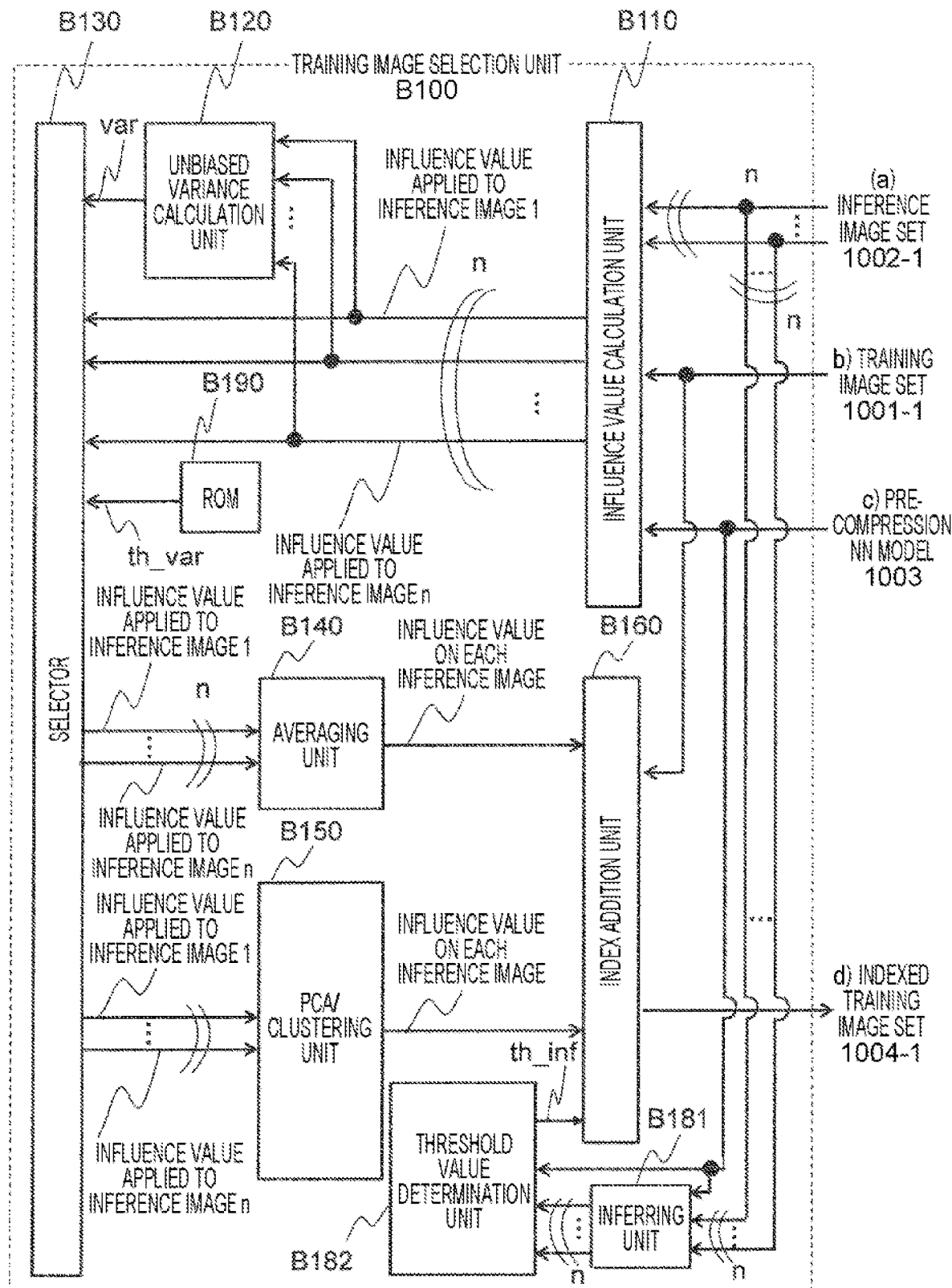
FIG. 20 is a diagram illustrating a configuration of a training image selection unit B100 in Embodiment 2.
Figure 21:
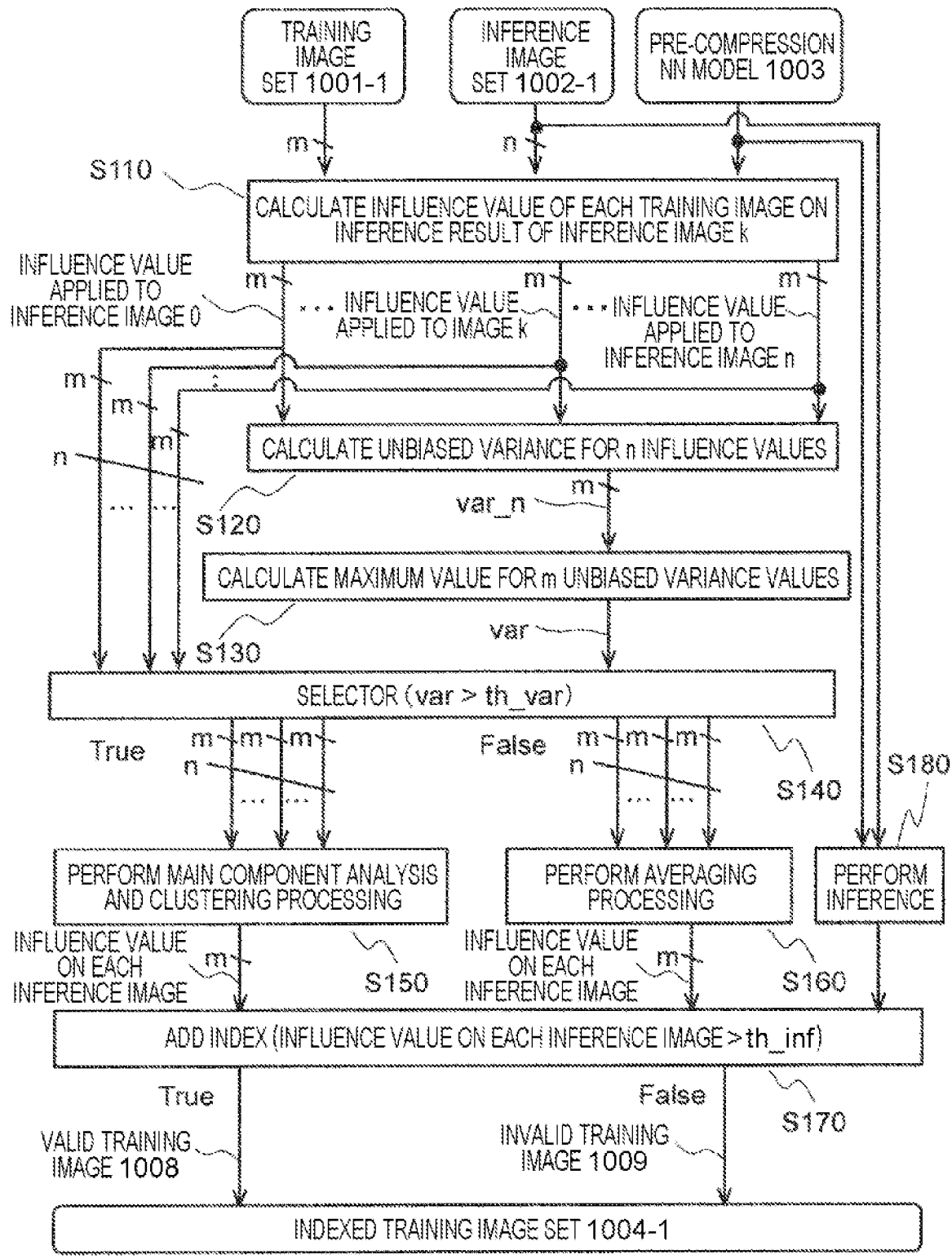
FIG. 21 is a diagram illustrating a processing flow of the training image selection unit B100 in Embodiment 2.

FIG. 20 is a diagram illustrating a configuration of the training image selection unit B100 in Embodiment 2. In the present configuration, an inferring unit B180 and a threshold value determination unit B170 are provided instead of the ROM B180 in Embodiment 1 (FIG. 12). FIG. 21 illustrates a processing flow of the training image selection unit B100 in Embodiment 2. In this processing flow, Step S180 is added to Embodiment 2 (FIG. 1). Since other components and processing flows are similar to those of Embodiment 1, only the above-described differences will be described.

In Step S180, the inferring unit B180 receives the inference data set 1002 and the pre-compression NN model 1003. The inferring unit B181 executes inference on the received data and outputs the certainty of the inference result. The threshold value determination unit B170 determines the value of the threshold value th_inf based on the certainty of the present inference result. The threshold value th_inf is used for adding an index in Step S170.

Embodiment 3

Next, Embodiment 3 will be described. Embodiment 3 is an example in which each of the above-described embodiments is applied to the AD-ECU 1. In Embodiment 3, compression of the NN is online tuned in the AD-ECU 1. The AD-ECU 1 is an autonomous driving or driving support ECU (also simply referred to as an autonomous driving ECU).

Figure 2:
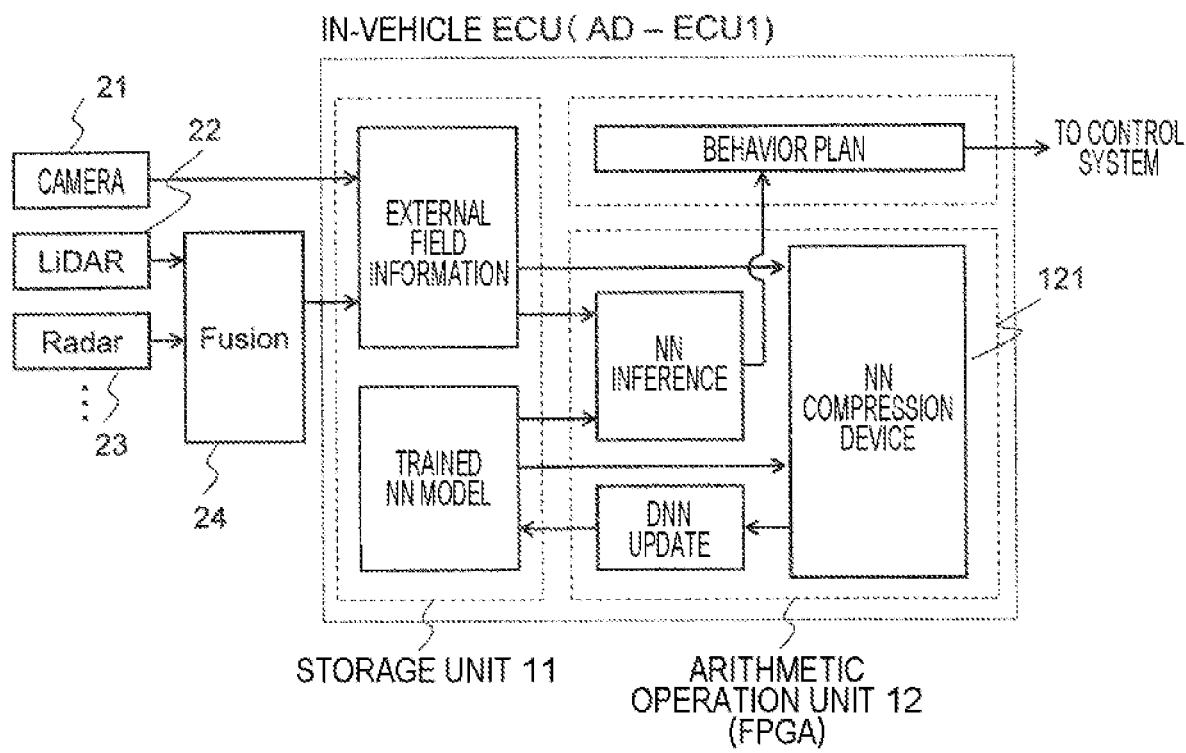
FIG. 2 is an overall configuration diagram of an in-vehicle ECU (AD-ECU 1) to which an embodiment of the present invention is applied.

FIG. 2 illustrates an overall configuration of the AD-ECU 1. The AD-ECU 1 is one type of in-vehicle ECU installed is a moving object such as a car, and executes information processing for autonomous driving and driving support. Specifically, external field information is acquired from sensors such as a camera 21, a light detection and ranging (LiDAR, Laser Imaging Detection and Ranging) 22, and a Rader 23. Regarding the external field information, information detected by the LIDAR 22 and the Rader 23 is merged to obtain the external field information. The external field information is stored in a storage unit 11. Compression in the NN compression device 121 is executed together with NN inference (neural network inference) and DNN inference by using the trained NN and the external field information stored in the storage unit 11. A behavior plan indicating control contents is output to a control system that controls an actuator, an engine, and the like, and autonomous driving and driving support are realized.

Figure 22:
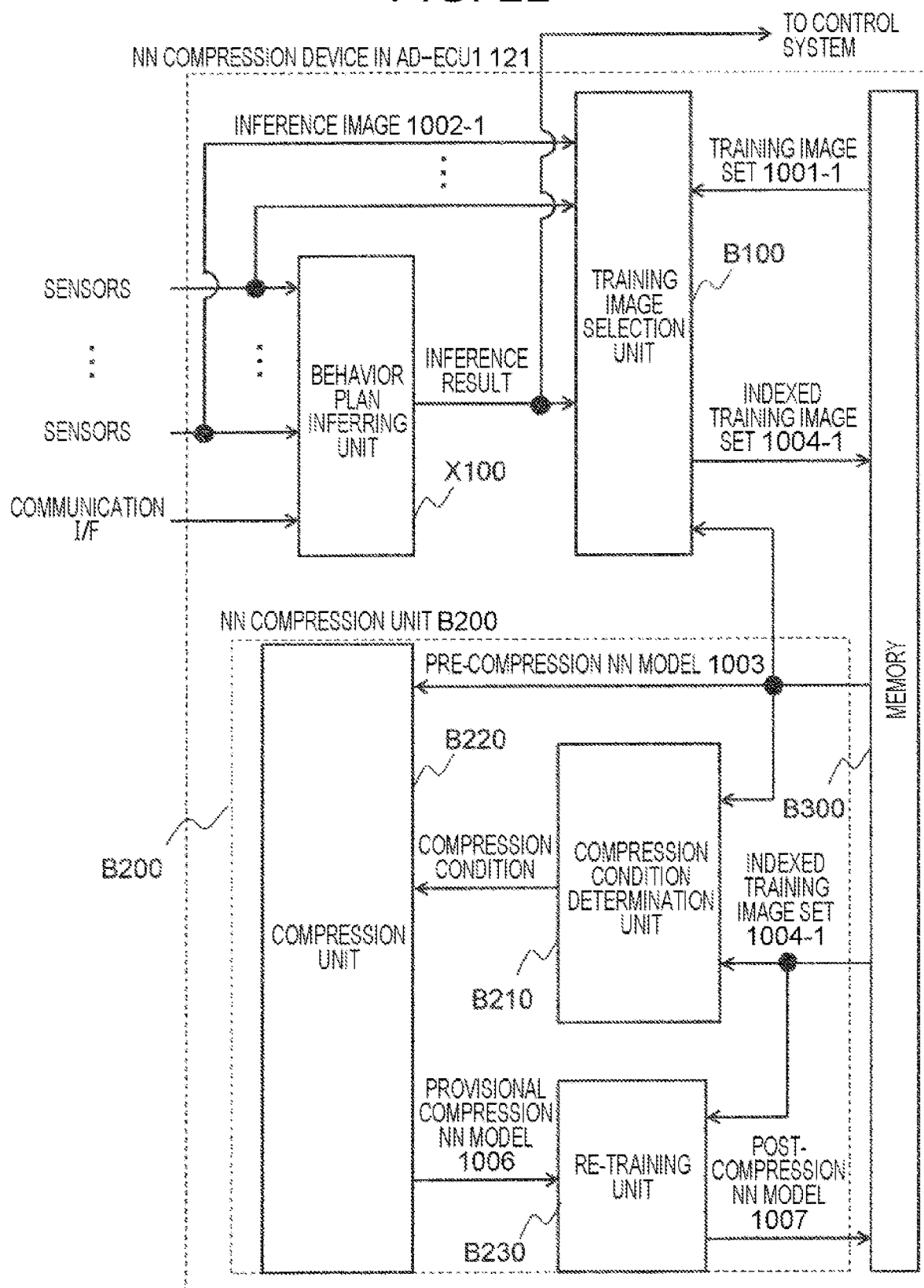
FIG. 22 is a diagram illustrating a configuration of an NN compression device 121 in an AD-ECU 1 in Embodiment 3.

FIG. 22 illustrates a device configuration of the NN compression device 121 in the AD-ECU 1. The NN compression device 121 illustrated in FIG. 10, the training image selection unit B100, the NW compression unit B200, and the memory B300 are common as the components. In addition, a behavior plan inferring unit X100 (output device) that outputs a behavior plan (inference result) to the control system is provided. The other components are similar to those in FIG. 10. In the NN compression device 121, a behavior plan (inference result) is output to the control system by using the inference image set 1002-1 being information acquired from the sensors, a situation of an engine of the moving object, and the like, and information input via a communication I/F. At this time, the compression processing and the re-training processing in Embodiments 1 and 2 are performed. Therefore, it possible to appropriately tune the NW in accordance with a travel environment, and it is possible to suppress a decrease in recognition accuracy of the post-compression NW model 1007 due to a change in the travel environment.

Furthermore, by applying each embodiment to autonomous driving and driving support, it is expected to improve the accuracy of recognizing an object such as pedestrians and automobiles, and to enhance security against a cyberattack of a third party using training image that induces erroneous recognition.

Embodiment 4

Next, Embodiment 4 will be described. In Embodiment 4, similarly to Embodiment 3, the functions of the respective embodiments are applied to the AD-ECU 1. In Embodiment 4, fine tuning of the NN is executed in the AD-ECU 1.

Figure 23:
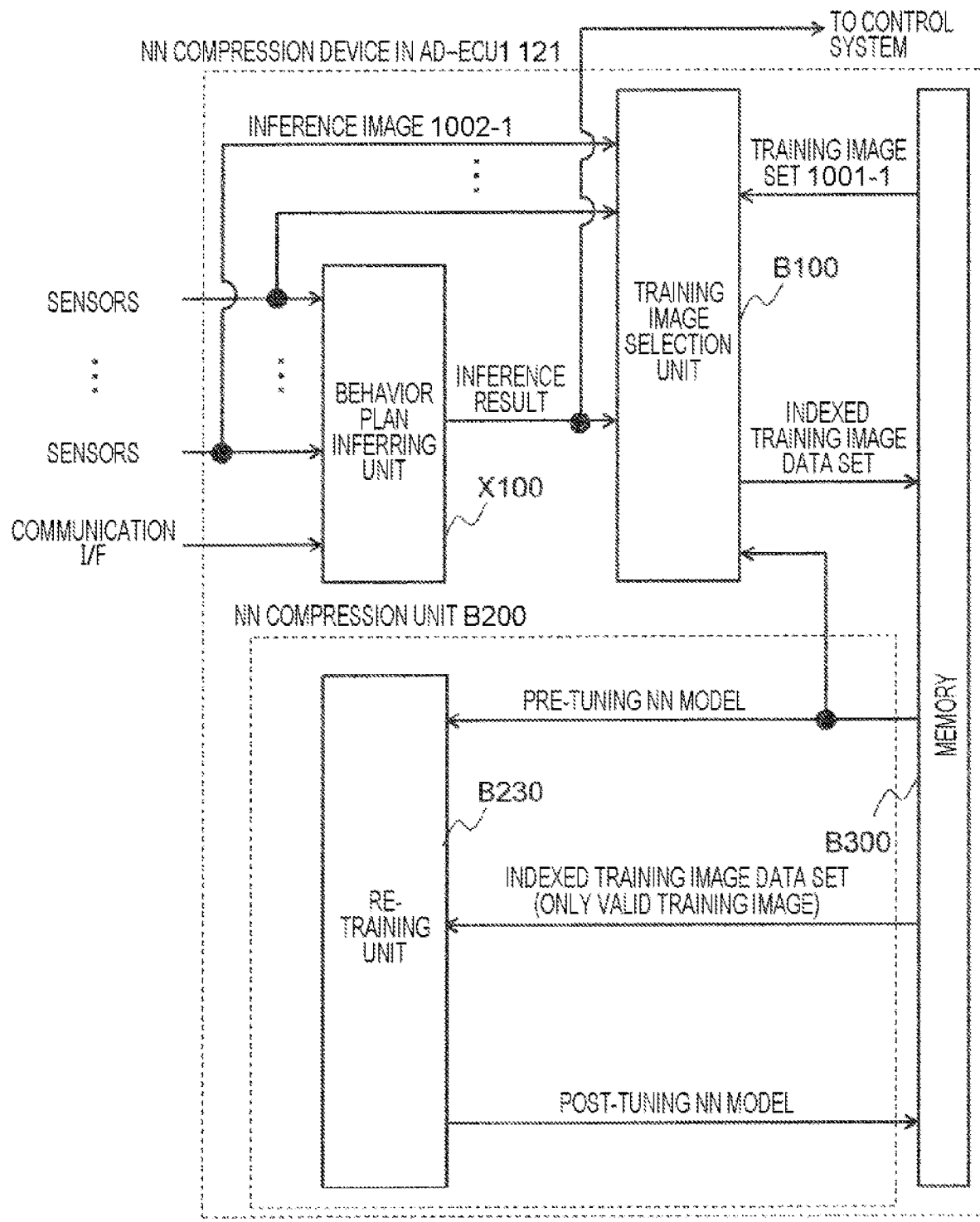
FIG. 23 is a diagram illustrating a configuration of an NN compression device 121 in an AD-ECU 1 in Embodiment 4.

FIG. 23 illustrates a device configuration an NN compression device 121 in Embodiment 4. In the present configuration, in Embodiment 3, the re-training unit B230 calculates a post-tuning NN model by using (the valid training image of) a pre-tuning NN model before fine-tuning and the indexed training image set 1004-1. This makes it possible to perform fine correction in accordance with the travel environment of the moving object. Therefore, in autonomous driving and driving support, it is expected to improve the accuracy of recognizing an object such as pedestrians and automobiles, and to enhance security against a cyberattack of a third party using a training image that induces erroneous recognition.

Embodiment 5

Figure 24:
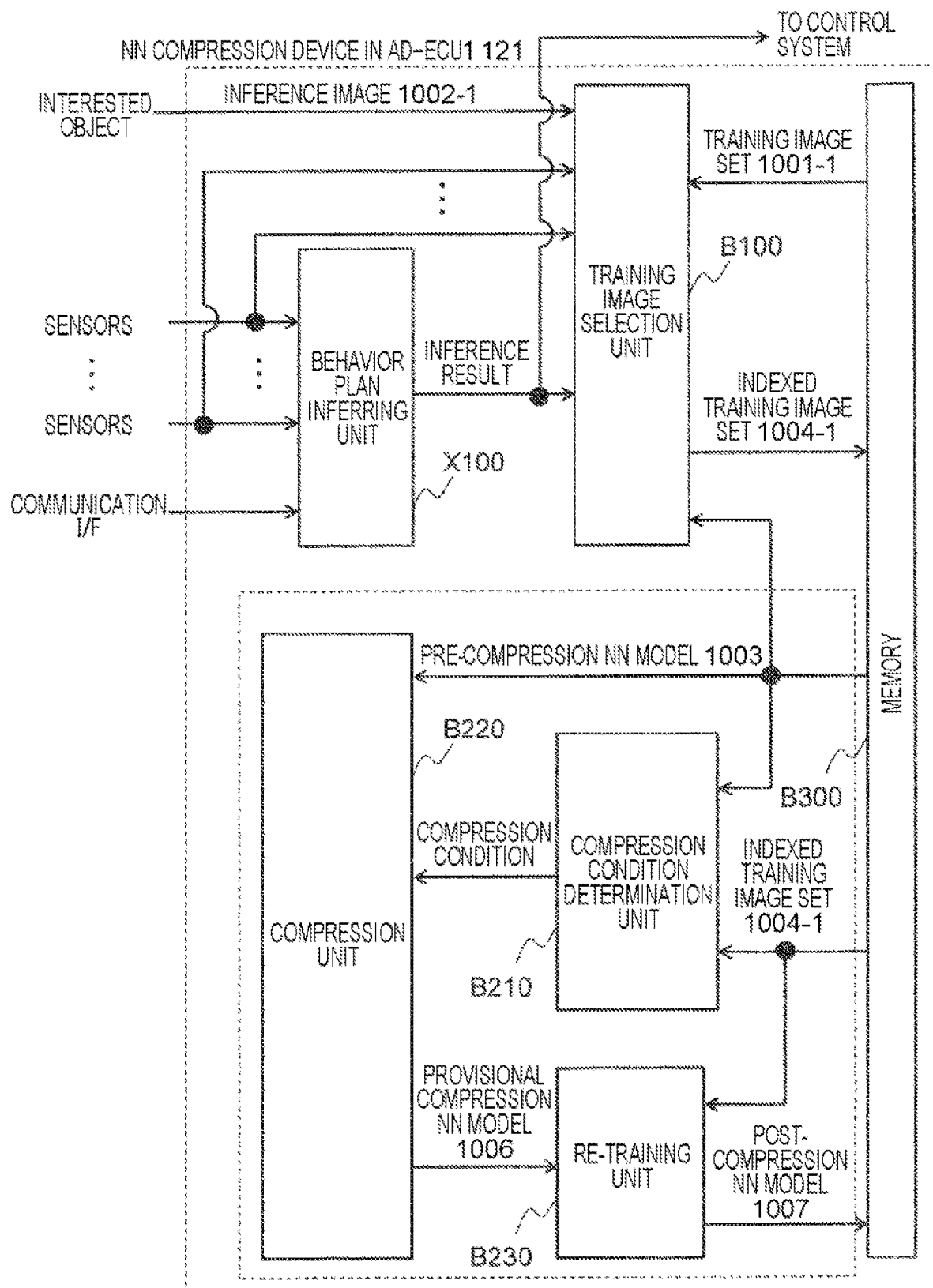
FIG. 24 is a diagram illustrating a configuration of an NN compression device 121 in an AD-ECU 1 in Embodiment 5.

Next, Embodiment 5 will be described. Embodiment 5 is an example in which compression of an NN is tuned by focusing on a specific "interested object" in the AD-ECU by using the present invention. FIG. 24 illustrates a device configuration of an NN compression device 121 in Embodiment 5. In the present configuration, information regarding the "interested object" is also input to the training image selection unit B100 and used for selection processing. In autonomous driving and driving support, a person, another vehicle, a bicycle, or the like is used as the interested object. By processing the images separately from other images, it is expected to improve the accuracy of recognizing an interested object such as pedestrians and automobiles, and to enhance security against a cyberattack of a third party using a training image that induces erroneous recognition.

Figure 9:
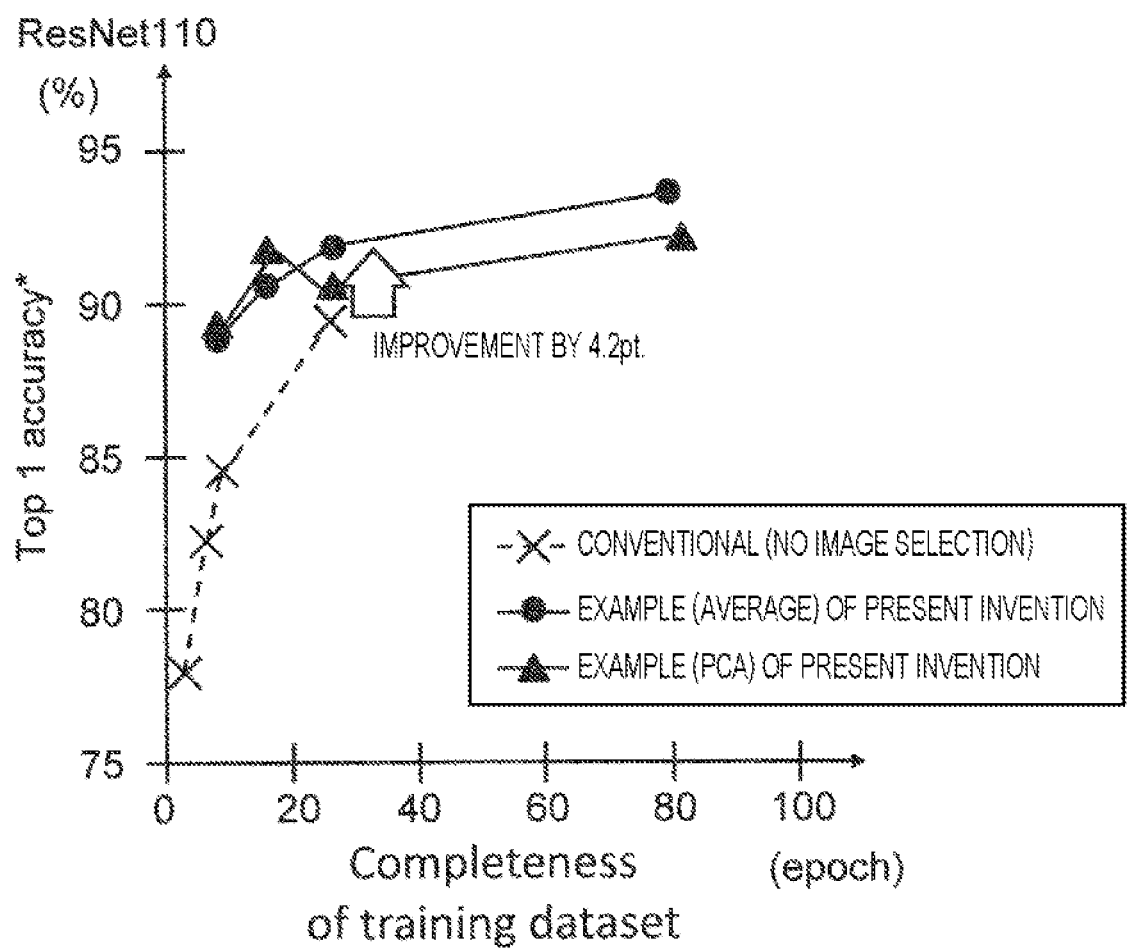
FIG. 9 is a diagram illustrating an effect of improving the recognition accuracy in the embodiment of the present invention.

According to the above embodiments, the following effects are obtained. FIGS. 8 and 9 illustrate evaluations of the recognition accuracy and the training time when the training of an identification problem is performed by ResNet 110. By applying each embodiment of the present invention, the training time until the same degree of recognition accuracy is achieved is reduced to ⅟10. Furthermore, by removing the invalid image using the present invention, it is possible to obtain an effect of improving the recognition accuracy by 4.2 pt when the same number of iterations is trained. Furthermore, it is possible to suppress (1) erroneous recognition of the post-compression NN model 1007 due to the presence of the invalid training image. Since the invalid training image can be excluded from the training data set used for re-training, it is possible to simultaneously suppress (2) prolongation of the compression design period due to the enormous number of training images.

Figure 3:
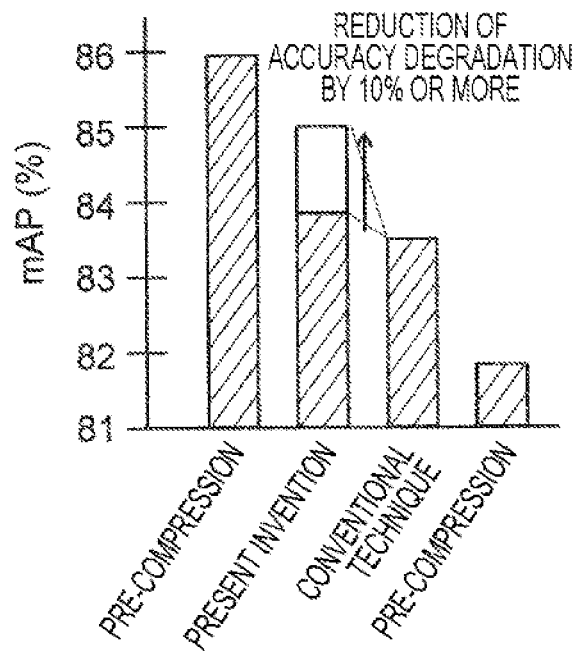
FIG. 3 is a diagram for explaining a relationship between compression and recognition accuracy.
Figure 4:
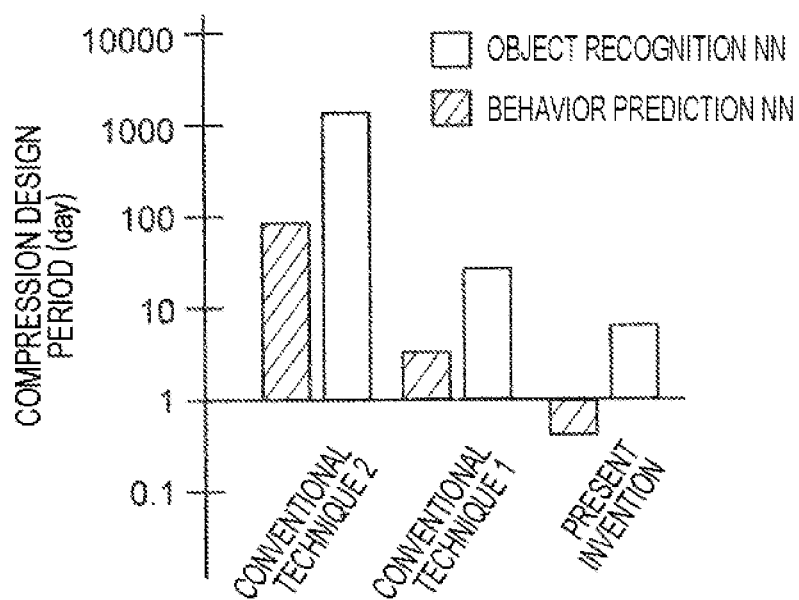
FIG. 4 is a diagram for explaining a relationship between the compression and a compression design period.

According to the embodiments of the present invention, as illustrated in FIGS. 3 and 4, it is possible to shorten recognition accuracy (suppression of recognition degradation) and a design period compared with the first and second conventional techniques.

The present technology can be extended not only to deep training but also to a classifier of classical machine training such as a support vector machine (SVM).

REFERENCE SIGNS LIST

B100 training image selection unit
B200 neural network compression unit
B300 memory
B110 influence value calculation unit
B160 index addition unit
B120 unbiased variance calculation unit
B130 selector
B140 averaging unit
B150 PCA/clustering unit
B220 compression unit
B230 re-training unit
B210 compression condition determination unit
B151 PCA unit
B152 dimension reducing unit
B153 clustering unit
B211, S211 neural network forward propagation unit
B170, B180, B154, B213, B190 ROM
B212 compression condition calculation unit
B181 inferring unit
X100 behavior plan inferring unit

The invention claimed is:

1. A neural network compression device that compresses a neural network by using a training data set that has been input, the neural network compression device comprising:
a training image selection unit that calculates an influence value on an inference result calculated by using an inference data set and a neural network model for the training data set, that classifies the training data set into valid training data necessary for the compression and invalid training data unnecessary for the compression, based on the influence value, and that generates an indexed training data set; and
a neural network compression unit that compresses the neural network model, based on the indexed training data set and the neural network model.

2. The neural network compression device according to claim 1, wherein
the training image selection unit generates the indexed training data set by assigning an index indicating the training image selection unit to at least one of the valid training data and the invalid training data.

3. The neural network compression device according to claim 2, wherein
the training image selection unit generates the indexed training data set by assigning an index indicating the training image selection unit to both the valid training data and the invalid training data.

4. The neural network compression device according to claim 1, wherein
the training image selection unit generates the indexed training data set by storing the valid training data and the invalid training data in storage media having different addresses.

5. The neural network compression device according to claim 1, wherein
the neural network compression unit executes re-training of the neural network that has been compressed, by using the valid training data.

6. The neural network compression device according to claim 1, wherein
the neural network compression unit uses a combination of activation frequencies of the valid training data and the invalid training data for neurons constituting the neural network to determine whether to remove the neuron, and executes the compression.

7. The neural network compression device according to claim 6, wherein
the neural network compression unit
removes the neuron having the activation frequency that is low in the valid training data and is high in the invalid training data, in preference to removal of the neuron having the activation frequency that is low in the valid training data and is low in the invalid training data.

8. An autonomous driving ECU installed in a moving object, the autonomous driving ECU comprising:
a storage device that stores external field information acquired from a sensor and a neural network;
the neural network compression device according to claim 1 that compresses the neural network stored in the storage device; and
an output device that outputs a behavior plan of the moving object to a control system of the moving object, by using the neural network that has been compressed.

9. A neural network compression method using a neural network compression device that compresses a neural network by using a training data set that has been input, the neural network compression method comprising:
calculating an influence value on an inference result calculated by using an inference data set and a neural network model for the training data set;
classifying the training data set into valid training data necessary for the compression and invalid training data unnecessary for the compression based on the influence value;
generating an indexed training data set; and
compressing the neural network model based on the indexed training data set and the neural network model.

10. The neural network compression method according to claim 9, wherein
the indexed training data set is generated by assigning an index indicating the training image selection unit to at least one of the valid training data and the invalid training data.

11. The neural network compression method according to claim 10, wherein
the indexed training data set is generated by assigning an index indicating the training image selection unit to both the valid training data and the invalid training data.

12. The neural network compression method according to claim 9, wherein
the indexed training data set is generated by storing the valid training data and the invalid training data in storage media having different addresses.

13. The neural network compression method according to claim 9, wherein
re-training of the neural network that has been compressed is executed by using the valid training data.

14. The neural network compression method according to claim 9, wherein
a combination of activation frequencies of the valid training data and the invalid training data for neurons constituting the neural network is used to determine whether to remove the neuron, and
the compression is executed.

15. The neural network compression method according to claim 14, wherein
the neuron having the activation frequency that is low in the valid training data and is high in the invalid training data is removed in preference to removal of the neuron having the activation frequency that is low in the valid training data and is low in the invalid training data.

\* \* \* \* \*